United States Patent

Oh et al.

[11] Patent Number: 6,037,868
[45] Date of Patent: Mar. 14, 2000

[54] ALARM METHOD AND APPARATUS FOR A MOBILE COMMUNICATION REPEATING SYSTEM

[75] Inventors: Chang-Heon Oh; Kwang-Il Ko, both of Seoul, Rep. of Korea

[73] Assignee: Samsung Electronics Co., Ltd., Rep. of Korea

[21] Appl. No.: 09/050,442

[22] Filed: Mar. 30, 1998

[30] Foreign Application Priority Data

Jul. 4, 1997 [KR] Rep. of Korea ............ 97-30974

[51] Int. Cl.[7] ................ G08B 1/08; H04B 7/15
[52] U.S. Cl. .......... 340/539; 340/425.1; 455/423; 455/7; 455/8; 455/11.1
[58] Field of Search ............... 340/539, 531, 340/505, 825.06, 825.07, 425.1; 455/423, 404, 7, 9, 11.1, 8, 10, 13.1

[56] References Cited

U.S. PATENT DOCUMENTS

| | | | |
|---|---|---|---|
| 4,400,694 | 8/1983 | Wong et al. | 340/505 |
| 4,449,247 | 5/1984 | Waschka, Jr. | 455/9 |
| 4,996,518 | 2/1991 | Takahashi et al. | 340/518 |
| 5,361,402 | 11/1994 | Grube et al. | 455/9 |

*Primary Examiner*—Donnie L. Crosland
*Attorney, Agent, or Firm*—Dilworth & Barrese

[57] ABSTRACT

An alarm method and apparatus in a mobile communication repeating system having a plurality of repeating modules for informing a base station that a repeating module is out of order. The repeating modules respectively check whether a self repeating module is out of order. A repeating interface unit informs the base station of an alarm state according to a failure of a particular repeating module.

11 Claims, 5 Drawing Sheets

ALARM METHOD AND APPARATUS FOR A MOBILE COMMUNICATION REPEATING SYSTEM

BACKGROUND OF THE INVENTION

1. Field of the Invention

The present invention relates to a mobile communication system and, more particularly, to an alarm method and apparatus for informing a base station that a repeating module is out of order in a mobile communication repeating system having a plurality of repeating modules.

2. Description of the Related Art

A cellular system, which is a typical mobile communication system, provides communication services for a plurality of mobile stations from base stations that are positioned at regular intervals. The base stations are situated at fixed locations, whereas the mobile station travels according to the position of a user. The mobile station may sometimes be located in radio wave shadow areas, such as in the interior of a building, subway station or arcade or in the closed space of an elevator. When a radio wave from the base station is transmitted to such an area, there is a great path loss. For instance, the radio wave at the interior of a building is characterized by multipath fading having a very short delay. Consequently, the signal performance diminishes when the radio wave is transmitted from the base station to the interior of a building. Moreover, if the radio wave is transmitted from the base station to the rear of a wall or an elevator, the signal performance diminishes due to a shadow phenomenon which makes it difficult to provide communication services to a mobile station located in such radio wave shadow areas as a result of the signal degradation.

Therefore, certain techniques have been proposed for enlarging a communication service area irrespective of the position of the mobile station. For example, the techniques disclosed in U.S. Pat. No. 5,280,472 to Gilhousen, et al., entitled "CDMA MICROCELLULAR TELEPHONE SYSTEM AND DISTRIBUTED ANTENNA SYSTEM THEREFOR", and Korean Patent Application No. 96-15231 filed by Chang-hyun Oh, on May 9, 1996, for repeating a code division multiple access (CDMA) communication signal (in a CDMA system) between a plurality of distributed antennas and base station transceivers and in a CDMA system having a plurality of "delay elements" or "distributed elements" which are repeating modules that communicate with the mobile station through each antenna. This distributed antenna system provides multipath signals for facilitating signal diversity. Consequently, the communication services can be supplied to mobile stations located in radio wave shadow areas, thereby improving the performance of the system.

In the above disclosed mobile communication systems, however, the repeating modules are remotely located from the base station and are operated by unmanned control. Therefore, the base station can not determine if any of the repeating modules are out of order. For example, each repeating module displays only a power ON/OFF state via a light emitting diode (LED) which is installed at its front surface. Indeed, these systems do not provide methods for either checking whether the repeating module is out of order, displaying a failure indication or informing the base station that the repeating module is out of order. Therefore, the base station cannot monitor an alarm state of the repeating module. Consequently, both the management efficiency and the reliability of the system is diminished and degraded.

SUMMARY OF THE INVENTION

It is therefore an object of the present invention to provide a method and apparatus for monitoring alarm states of repeating modules from a base station.

In an alarm method of a mobile communication repeating system embodying the present invention, repeating modules respectively check whether a self-repeating module is out of order. A repeating interface unit informs a base station transceiver of an alarm state in accordance with the failure of a repeating module.

An alarm apparatus of a mobile communication repeating system embodying the present invention includes: an alarm monitor installed at a repeating interface unit, for transmitting a state inquiry message for inquiring whether repeating modules are out of order by sequentially designating the repeating modules, and informing a base station transceiver of an alarm state according to state information of an acknowledge message received from a corresponding repeating module; and a failure detector installed at the repeating modules one by one, for checking whether a self repeating module is out of order in response to the state inquiry message designating the self repeating module, and transmitting state information to the alarm monitor.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

In the following description and drawings, specific details such as circuit configurations, processing flows and message formats, are set forth to provide a more thorough understanding of the present invention. It will be apparent to one of ordinary skill in the art, however, that the present invention may be practiced without these specific details. In other instances, descriptions of well-known functions and constructions have been omitted so as not to obscure the present invention.

Figure 1:
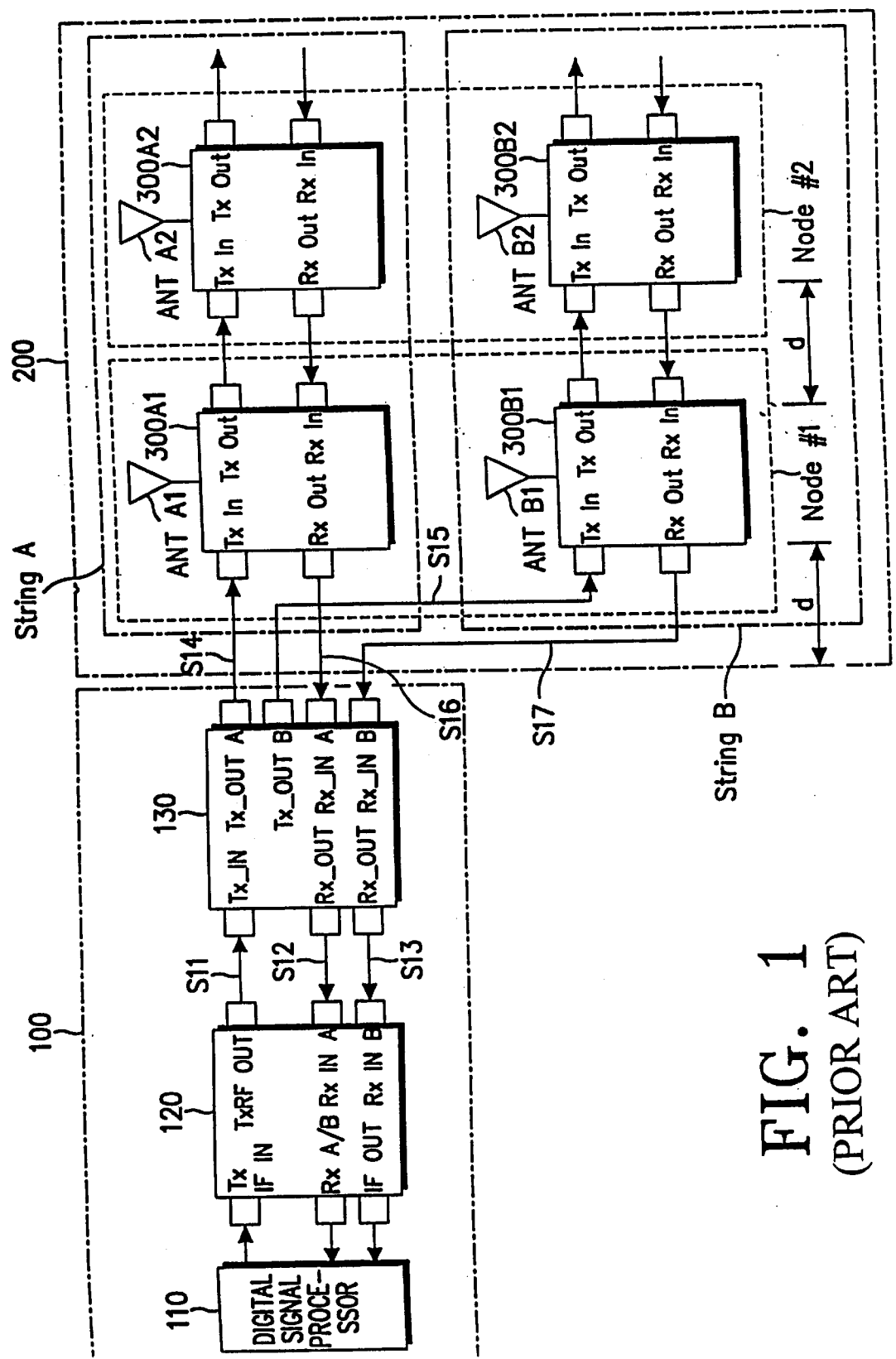
FIG. 1 is a block diagram of a mobile communication repeating system in which the present invention is implemented.

Referring to FIG. 1, a radio wave repeating apparatus of a CDMA communication system which is disclosed in the above-mentioned Korean Patent application No. 96-15231 is shown. The radio wave repeating apparatus of FIG. 1 generally includes a base station 100 and a distributed antenna element (DAE) 200. The base station 100 includes a digital signal processor 110, a transceiver 120 and a distributed antenna interface (DAI) 130. The digital signal processor 110 processes a transmitting digital signal to generate an intermediate frequency (IF) signal and processes a received IF signal to restore the digital signal. The transceiver 120 converts the IF signal generated from the digital signal processor 110 into a CDMA high frequency signal and converts a received CDMA high frequency signal into an IF signal. The DAI 130 is electrically connected between the transceiver 120 and the DAE 200. Through terminal Tx_IN, the DAI 130 receives a high frequency signal S11 (in the frequency range of 869–894 MHz) from the transceiver 120, wherein the S11 signal is attenuated and amplified and then transmitted through terminal Tx_OUT A as signal S14. Further, the DAI 130 delays the signal S11 for a prescribed time, and then generates the delayed S11 signal (i.e., signal S15) through terminal Tx_OUT B. The signal S15 generated from the DAI 130 allows a mobile station to operate as a RAKE receiver. The signal S15 is delayed by 1.25 $\mu$s as compared with the signal S14.

The DAI 130 also receives a signal S16 (in the frequency range of 824–849 MHz) and a signal S17 (in the frequency range of 824–849 MHz) through terminals Rx_IN A and Rx_IN B, respectively, wherein such signals are attenuated and amplified to generate respective signals S12 and S13. The signals S12 and S13 are transmitted to the transceiver 120 through DAI 130 terminals Rx_OUT A and Rx_OUT B, respectively.

The DAE 200 has distributed elements 300A1, 300A2, 300B1 and 300B2 for providing time diversity and space diversity in order to support services even in radio wave shadow areas such as described above. The DAE 200 includes a first DAE string (String A) and a second DAE string (String B). The first DAE string (String A) consists of a series of antennas ANT A1 and ANT A2, which are distributively connected to each other in space, as well as distributed elements 300A1 and 300A2, which are connected to antennas ANT A1 and ANT A2, respectively. The second DAE string (string B) consists of a series of antennas ANT B1 and ANT B2, which are distributively connected to each other in different space from the first DAE string, as well as distributed elements 300B1 and 300B2, which are connected to the antennas ANT B1 and ANT B2, respectively. The distributed elements 300A1 and 300B1 are identically positioned in any one space to form a first node Node #1, and the distributed elements 300A2 and 300B2 are identically positioned in another space to form a second node Node #2, so as to provide space diversity. The number of distributed elements and corresponding antennas may be increased notwithstanding that the system of FIG. 1 illustrates each DAE string having only two distributed elements and two antennas.

The DAI 130 and the DAE 200 constitute a distributed antenna apparatus. One distributed element transmits a signal received from either the DAI 130 or another distributed element to the mobile station through an antenna, and transmits a signal received from the mobile station to either another distributed element or the DAI 130. Each distributed element delays and then transmits the CDMA signal which is transmitted from the transceiver 120 and processed by the DAI 130. The two distributed elements 300A1 and 300B1 of the first node Node #1 receive signals S14 and S15 that (as described above) are delayed by 0 $\mu$s and 1.25 $\mu$s, respectively, and then transmit signals that are further delayed by 2.5 $\mu$s to the second node Node #2, as well as the mobile station through the antennas ANT A1 and ANT B1, respectively. Since the mobile station receives signals transmitted from the two nodes, it can operate as the RAKE receiver. For example, if the mobile station moves to the second node from the first node, the signal strength of the 0 $\mu$s and 1.25$\mu$ is delayed signals increase whereas the signal strength of the 2.5 $\mu$s and 3.75 $\mu$s delayed signals decrease. Therefore, since the mobile station receives the signals transmitted from the second node, the mobile station operates as the RAKE receiver.

Hereinafter, preferred embodiments of the present invention as they are applied to the above disclosed system of the Korean Patent application No. 96-15231 will be described. The distributed elements 300A1, 300A2, 300B1 and 300B2 are referred to as the repeating modules, and the DAI 130 is referred to as a repeating interface. By way of example, it is assumed that the number of distributed elements within the DAE 200 (including the elements 300A1, 300A2, 300B1 and 300B2) is 16, with the number of distributed elements for each of the first and second DAE strings being 8.

Figure 2:
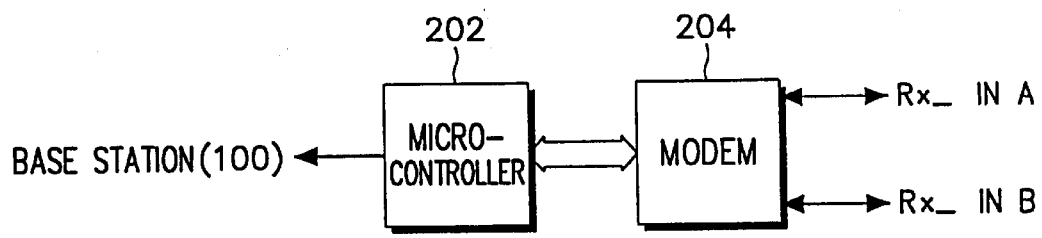
FIG. 2 is a block diagram of an alarm monitor according to an embodiment of the present invention.

Referring now to FIG. 2, an alarm monitor in accordance with the present invention as applied to the radio wave repeating apparatus of FIG. 1 is shown. The alarm monitor includes a microcontroller 202 and a modem 204 and is connected to the DAI 130 of the base station 100 (shown in FIG. 1). The alarm monitor, under the control of the microcontroller 202, transmits a state inquiry message by sequentially designating the distributed elements and then informs the base station 100 of an alarm state in accordance with state information of an acknowledge message that is received from a corresponding distributed element. The state inquiry message inquires as to whether the distributed elements are out of order.

Figure 4:
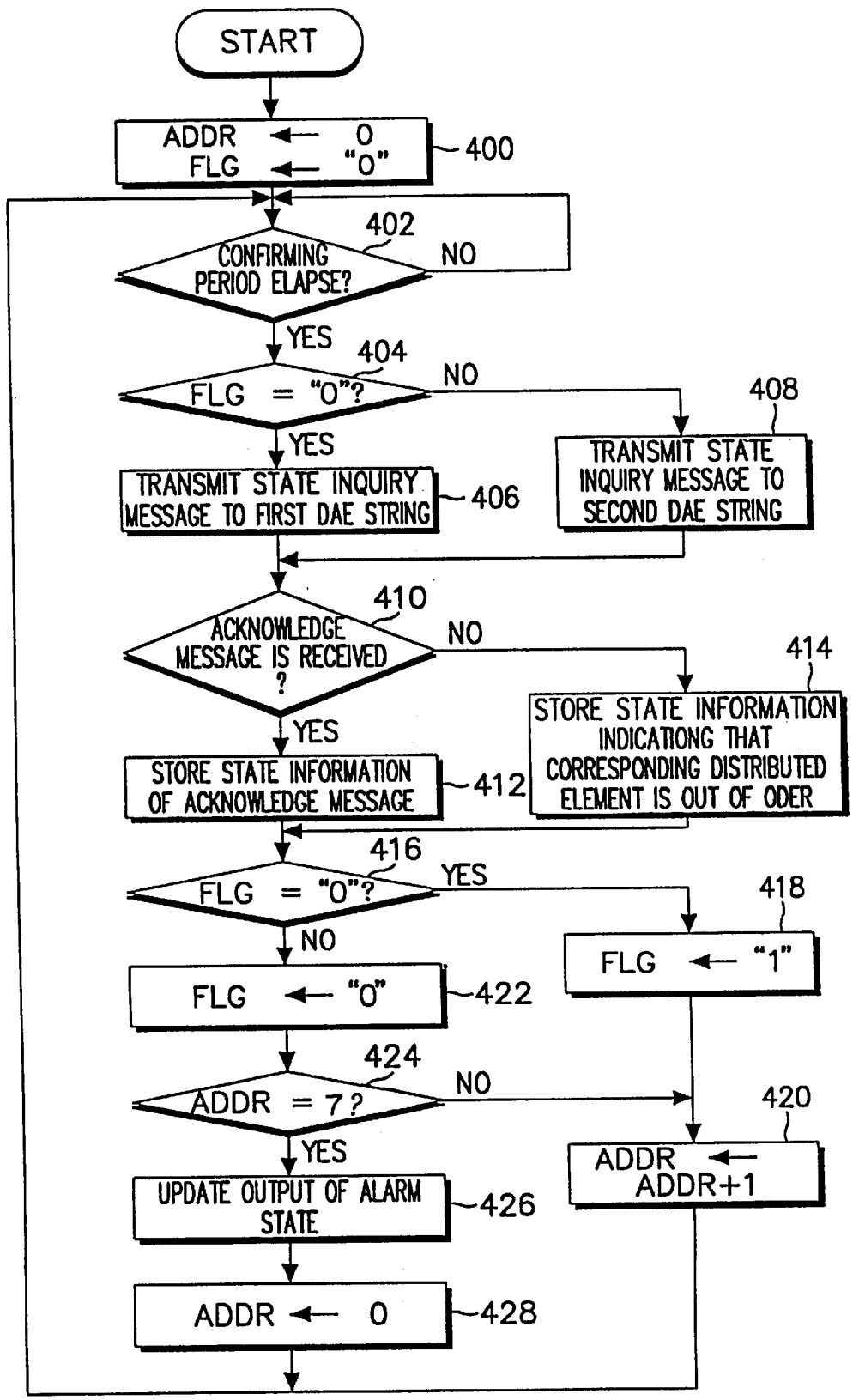
FIG. 4 is a flow diagram of an alarm method performed by the microcontroller of the alarm monitor in FIG. 2 in accordance with the present invention.

As stated above, the microcontroller 202 controls the operations of the alarm monitor. In a preferred embodiment of the present invention, the microcontroller 202 uses an 8-bit CMOS (Complementary Metal Oxide Semiconductor) EEPROM (Electrically Erasable and Programmable Read Only Memory) microcontroller. As discussed in detail below, the flow diagram of FIG. 4 illustrates the steps that the microcontroller 202 is programmed to perform. The microcontroller 202 is connected to the modem 204 and an upper level control device of a system (not shown) within the base station 100. Since the DAE 200 is remote from the base station 100 and the DAI 130 is located within the base station 100, a data transceiver or buffer is used to transmit data from the microcontroller 202 to the base station 100. The modem 204 is connected to the microcontroller 202 and to receiving terminals Rx_IN A and Rx_IN B of the DAI 130. Specifically, the modem 204 is connected to a high frequency coaxial cable receiving the high frequency signals S16 and S17 from the distributed elements 300A1, 300A2, 300B1 and 300B2.

Figure 3:
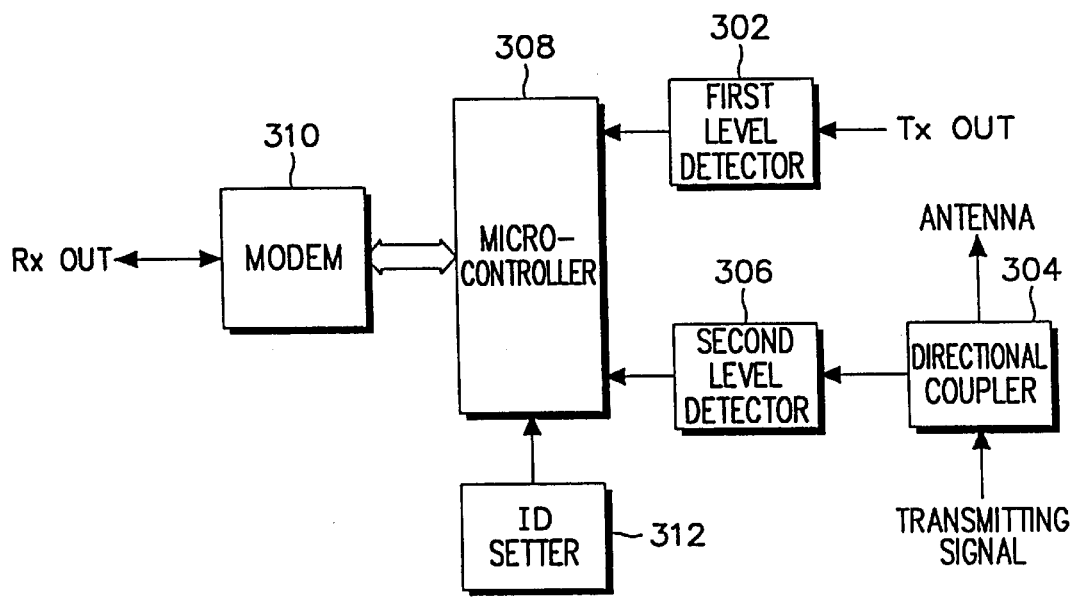
FIG. 3 is a block diagram of a failure detector according to an embodiment of the present invention.

Referring to FIG. 3, a failure detector in accordance with the present invention as applied to the radio wave repeating apparatus of FIG. 1 is shown. The failure detector includes a first level detector 302 and a second level detector 306, a directional coupler 304, a microcontroller 308, a modem 310, and an ID (Identification) setter 312. The failure detector of the present invention (shown in FIG. 3) is connected to each of the distributed elements 300A1, 300A2, 300B1 and 300B2 of FIG. 1. As explained in further detail below, the failure detector, under the control of the microcontroller 308, determines whether a particular self-distributed element is out of order in response to the state inquiry message designating the self-distributed element. The microcontroller 308 then transmits state information via the acknowledge message to the alarm monitor shown in FIG. 2. The self-distributed element refers to a distributed element at which the failure detector of FIG. 3 is installed.

The first level detector 302, operatively connected between the microcontroller 308 and a transmitting terminal Tx OUT of a self-distributed element, detects a high frequency transmitting signal level that is transmitted from the self-distributed element to another distributed element. The directional coupler 304, operatively disposed in the signal transmission path between the self-distributed element and the antenna of the self-distributed element, induces a signal which is reflected from the antenna. This directional coupler 304 is installed at the front terminal of a duplexer (not shown) which is connected to the antenna. Generally, the directional coupler induces a signal corresponding to $1/10$ to $1/10000$ of a level of the high frequency signal. The second level detector 306, operatively connected between the microcontroller 308 and the directional coupler 304, detects the level of the reflection signal generated from the directional coupler 304. The first and second level detectors 302 and 306 employ a Schottky diode detector to detect a DC voltage level by envelope-detecting the high frequency signals.

Figure 5:
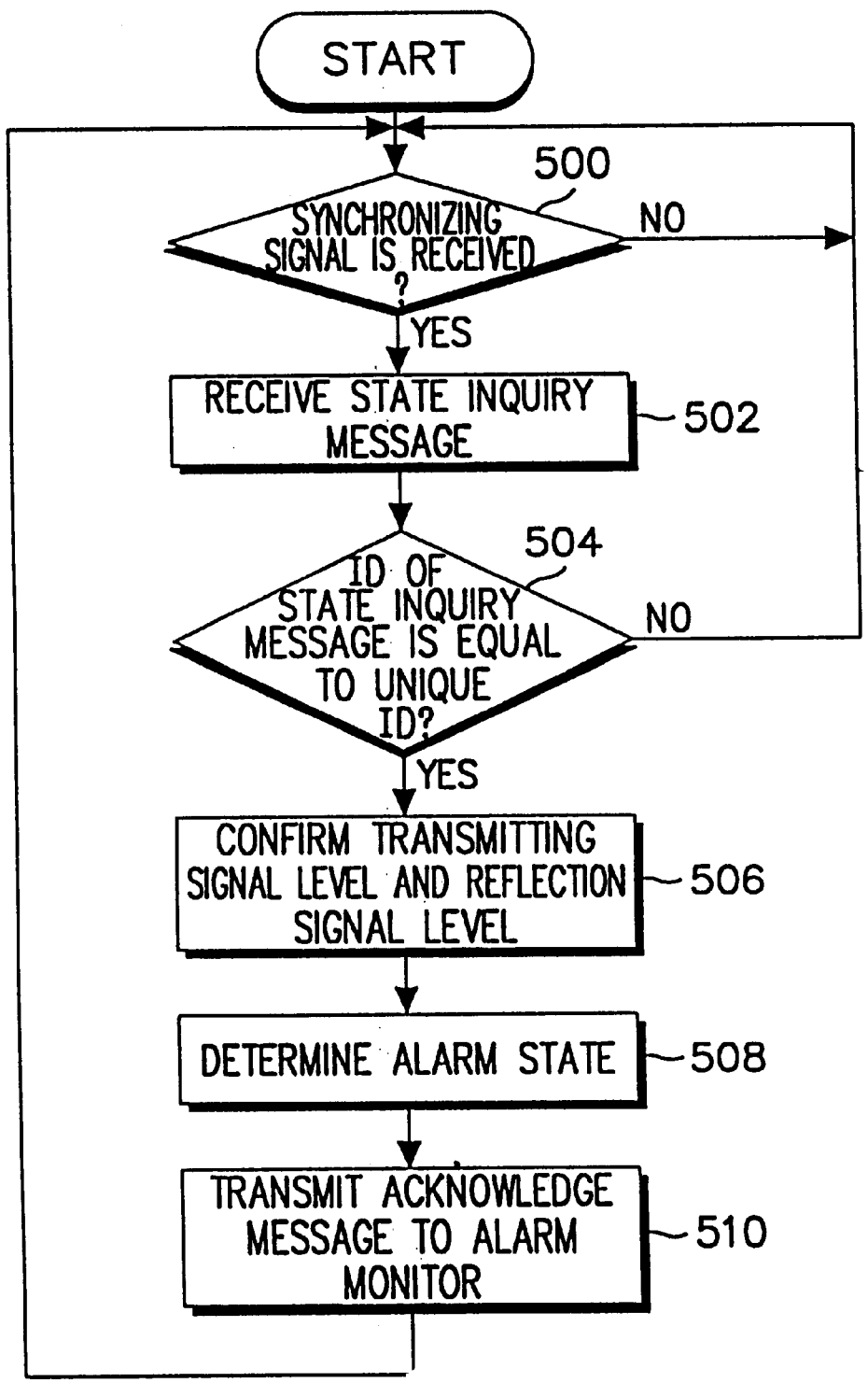
FIG. 5 is a flow diagram of an operation of the microcontroller of the failure detector of FIG. 3 for receiving a state inquiry message in accordance with the present invention.

The microcontroller 308 of the failure detector is used to control the operations of the failure detector. The microcontroller 308 is an 8-bit CMOS EEPROM microcontroller similar to the microcontroller 202 of the alarm monitor of FIG. 2. The operations illustrated in the flow diagram of FIG. 5 are programmed in the microcontroller 308. The microcontroller 308 is operatively connected to the first and second level detectors 302 and 306, the modem 310 and the ID setter 312. When the state inquiry message designating the self-distributed element is received from the alarm monitor, the microcontroller 308 of the failure detector checks whether the self-distributed element is operating properly by confirming the transmitting signal level and reflection signal level generated from the first and second level detectors 302 and 306, respectively. The microcontroller 308 then transmits an acknowledge message to the alarm monitor through the modem 310. The ID setter 312 sends a unique ID of the self-distributed element to the microcontroller 308. The ID setter 312 uses a dual in-line package (DIP) switch to generate the unique ID. For each of the distributed elements of the DAE 200, a unique address is set as an ID. Since it has been assumed that the number of the distributed elements within the DAE 200 is 16 (i.e., 8 distributed elements for String A and String B), a 3-bit address may be used to differentiate between the distributed elements of each string independently.

The alarm monitor of FIG. 2 and the failure detector of FIG. 3 can discriminate between the different distributed elements by the unique ID that is designated to each of the distributed elements upon the transmission and the receiving of the state inquiry message and the acknowledge message. Specifically, when the alarm monitor transmits the state inquiry message, it sequentially designates the distributed elements by the ID. After receiving the acknowledge message, the alarm monitor can determine which distributed element transmitted that particular message. Moreover, when the failure detector receives the state inquiry message, it can determine from the ID whether the particular self-distributed element is designated.

On the other hand, the modem 204 of the alarm monitor and the modem 310 of the failure detector are connected to each other through the high frequency coaxial cable (not shown) that receives the high frequency signals S16 and S17 from the distributed elements. Since the modems 204 and 310 use a low frequency signal in comparison with the high frequency signals S16 and S17, an additional transmission path is not required. This transmission path transmits only the high frequency signal. However, a power source is supplied to the distributed elements through the high frequency coaxial cable which transmits the high frequency signals S14 and S15.

Figure 6A:
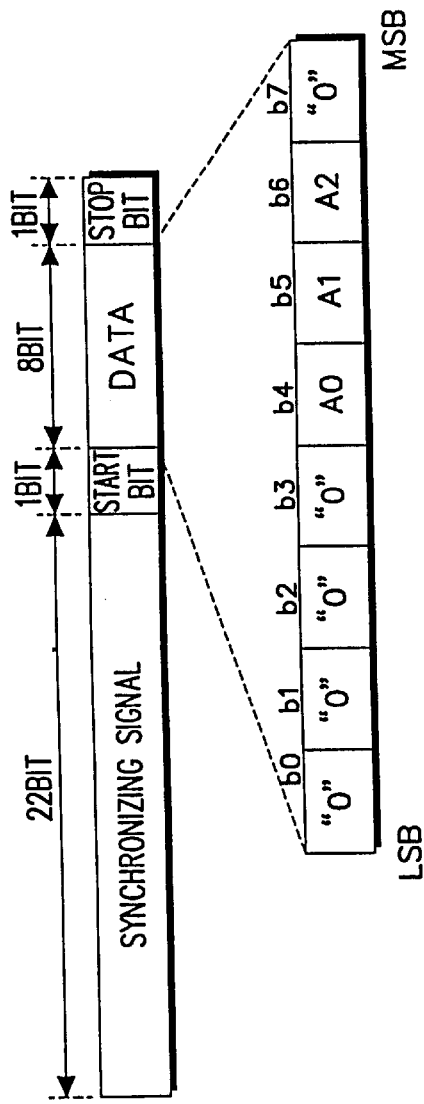
FIG. 6a illustrates a format of a state inquiry message according to an embodiment of the present invention.

A start-stop synchronization system is used between the modems 204 and 310. The state inquiry message and the acknowledge message are transmitted and received in accordance with the message formats illustrated in FIGS. 6a and 6b, respectively. Specifically, FIG. 6a shows the format of the state inquiry message which is transmitted to the failure detector from the alarm monitor. The state inquiry message consists of a 22 bit synchronizing signal, a single start bit, an 8 bit data signal, and a single stop bit. The data signal corresponds to the unique ID which is designating one of the distributed elements. In a preferred embodiment of the present invention, as shown in FIG. 6a, three bits of the 8 bit data signal (i.e., b4, b5 and b6 of bits b0–b7) are utilized to designate the ID. Namely, three ID bits A0, A1 and A2 are transmitted in bit locations b4, b5 and b6, respectively. When the alarm monitor transmits the state inquiry message, a synchronizing signal consisting of 20 logic "0" bits and 2 logic "1" bits is transmitted to indicate the start of communication sequence, with the start bit, data bits and stop bit being sequentially transmitted. The data is transmitted in the order of the least significant bit (LSB) (i.e., b0) to the most significant bit (MSB) (i.e., b7) at a 128 baud rate and communication speed of 128 bps. By transmitting the synchronizing signal of 20 logic "0" bits and 2 logic "1" bits, the failure detector of a particular distributed element can return to a receiving standby state from a start bit standby state by detecting a signal by the 10-th bit (i.e., the stop bit).

Figure 6B:
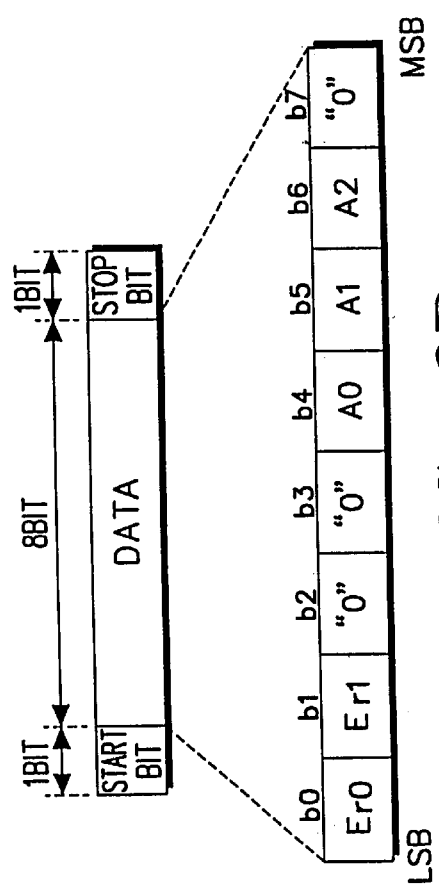
FIG. 6b illustrates a format of an acknowledge message according to an embodiment of the present invention.

Referring now to FIG. 6b, a format of the acknowledge message which is transmitted to the alarm monitor from the failure detector is illustrated. The acknowledge message consists of a single start bit, an 8 bit data signal, and a single stop bit. The data signal includes an ID of the self-distributed element and the state 294 information. Specifically, the ID is the three bits b4, b5 and b6 (from bit string b0–b7) corresponding to A0, A1 and A2, respectively. The state information data, Er0 and Er1, is transmitted in the LSBs b0 and b1.

The data bit Er0 designates that portion of the state information which indicates a transmitting failure state. The microcontroller 308 compares the transmitting signal level detected by the first level detector 302 with a first reference level. If the transmitting signal level is lower than the first reference level, the microcontroller 308 determines that self-distributed element as the transmitting failure state and encodes data bit Er0 accordingly. Specifically, a state information Er0 of logic "1" indicates the transmitting failure state whereas an Er0 of logic "0" represents a normal state.

Next, the data bit Er1 designates that portion of the state information which indicates a voltage standing wave ratio (VSWR) failure state. The microcontroller 308 compares the reflection signal level detected by the second level detector 306 with a second reference level. If the detected reflection signal level is higher than the second reference level, the microcontroller 308 determines the self-distributed element as the VSWR failure state and encodes data bit Er1 accordingly. Specifically, the state information Er1 of logic "1" represents the VSWR failure state whereas an Er1 of logic "0" indicates the normal state.

Referring now to FIG. 4, a flow diagram of the operation of microcontroller 202 of the alarm monitor (FIG. 2) is shown. Initially, the microcontroller 202 clears an address ADDR to 0 and sets a flag FLG to logic "0" during an initialization operation such as power-on (step 400). The address ADDR is a value for sequentially designating the distributed elements and, as explained above, corresponds to the ID of the distributed element. The address ADDR is sequentially increased from 0 to 7 in increments of 1. When the address ADDR is increased up to 7, it is initialized to 0. The flag FLG is used to differentiate between the first and second DAE strings because they have different transmission paths as shown in FIG. 1. It is assumed that a FLG of logic "0" designates the first DAE string, and that a FLG of logic "1" designates the second DAE string.

Next, it is determined whether a confirming period has elapsed (step 402). By way of example, assume that the confirming period is set to 0.5 seconds. If it is determined that the confirming period has elapsed, the next step is to check the flag FLG (step 404). If FLG is determined to be logic "0", a state inquiry message with the address ADDR of 0 as the ID is transmitted to the first DAE string through the modem 204 (step 406). After initialization, since the first address ADDR is 0, the ID will be an ID of the first distributed element, e.g., the distributed element 300A1 of the first DAE string shown in FIG. 1. On the other hand, if FLG is determined to be logic "1", the state inquiry message with the address ADDR of 0 as the ID is transmitted to the second DAE string through the modem 204 (step 408). Next, a determination is made as to whether an acknowledge message has been received in response to the transmitted state inquiry message (step 410).

Referring now to FIG. 5, a flow diagram of the operation of the microcontroller 308 of the failure detector after receiving the transmitted state inquiry message (steps 406 or 408 in FIG. 4) is shown. The microcontroller 308 waits for the synchronizing signal during a receiving standby state (step 500). When a synchronizing signal is received by the modem 310, the microcontroller 308 receives the state inquiry message following the synchronizing signal (step 502).

Next, the microcontroller 308 determines whether the ID of the state inquiry message is equal to a unique ID set by the ID setter 312 (step 504). If they are not equal, microcontroller 308 returns to step 500 since the ID of the state inquiry message does not designate the self-distributed element. On the other hand, if they are equal, the transmitting signal level and the reflection signal level generated from the first and second level detectors 300 and 304, respectively, are confirmed (step 506). Next, an alarm state is determined by checking whether the self-distributed element is out of order (step 508). In particular, as mentioned above, if the level of the transmitting signal is lower than the first reference level, the self-distributed element is determined to be in a transmitting failure state. Moreover, if the level of the reflection signal is higher than the second reference signal, the self-distributed element is determined to be in the VSWR failure state.

The microcontroller 308 of the failure detector then transmits an acknowledge message to the alarm monitor through the modem 310 according to the state information of the alarm state (step 510). The acknowledge message includes the state information Er0 and Er1 and the ID information A0, A1 and A2 of the selfdistributed element. The microcontroller 308 then returns to the receiving standby state of step 500. As shown above, the failure detector checks whether the self-distributed element is out of order in response to the state inquiry message designating the self-distributed element and transmits the state information to the alarm monitor.

Referring back to step 410 of FIG. 4, if the acknowledge message is received from the failure detector of the distributed element, the microcontroller 202 stores the state information of the acknowledge message (step 412). If, on the other hand, the acknowledge message is not received, it is assumed that the corresponding distributed element is out of order and the microcontroller 202 stores the state information indicating that the corresponding distributed element is out of order (step 414).

Next, the flag is checked to determine whether FLG is logic "0" (step 416). If it is determined that FLG is logic "0", FLG is set to logic "1" (step 418) and then the address ADDR is increased by 1 (step 420). Thereafter, the above operations are repeated with respect to the next distributed element designated by the address ADDR (return to step 402). If (at step 416) FLG is determined to be logic "1", FLG is initialized to logic "0" (step 422). Next, the address is checked to determine whether the address ADDR is 7 (step 124). If ADDR is 7, it is determined that the above operations for all the distributed elements (i.e., the 16 distributed elements of the DAE 200 for the two separate strings each having 8 distributed elements) in the above example are completed. Next, an output of the alarm state of the base station 100 is updated (step 426). In particular, if the confirmation of the alarm state for the 16 distributed elements is ended, the microcontroller 202 informs the base station of a confirmation result. Since the above operations are implemented 16 times with respect to the first and second DAE strings at intervals of, e.g., 0.5 seconds, the alarm output is updated once every 8 seconds. The microcontroller 202 then initializes the address ADDR to 0 (step 428) and the process flow returns to step 402. Moreover, if (at step 424) the address ADDR is not 7, ADDR is increased by 1 (step 420) and the process returns to step 402.

As demonstrated above, the alarm monitor inquires whether the distributed elements are out of order and informs the base station of the alarm state according to the state information of the acknowledge message received from the corresponding distributed element. Consequently, the distributed elements (i.e., the repeating modules) detect their failure states and the DAI (i.e., the repeating interface unit) informs the base station of the alarm state according to the failure state of the repeating module. Advantageously, since the base station can monitor the alarm state of the repeating module by the output of the alarm state, a system may be used efficiently used and the reliability improved.

While the invention has been shown and described with reference to a particular preferred embodiment thereof, it is to be understood by those skilled in the art that various changes in form and details may be made therein without departing from the spirit and scope of the invention. For example, the present invention may be applied to a mobile communication system such as a personal communication service (PCS) using the repeating modules in order to obtain enhanced system performance by repeating a communication signal. The order of confirming the alarm state of the repeating modules, confirming period, or an output updating period of the alarm state may also be varied. Therefore, it is not intended that the present invention be limited to the specific embodiment disclosed as the best mode contemplated for carrying out the present invention, but that the present invention includes all embodiments falling within the scope of the appended claims.

What is claimed is:

1. An alarm method in a mobile communication repeating system having a plurality of repeating modules and a repeating interface unit for providing an interface between said plurality of repeating modules and a base station transceiver, comprising the steps of:

determining an alarm state by said repeating modules by checking whether a self-repeating module is in a failure state by comparing at least a first and second signal level with at least a first and second reference level, respectively; and informing said base station transceiver of said alarm state when said self-repeating module is in said failure state, wherein said failure state includes one of a transmitting failure state, a voltage standing wave ratio (VSWR) failure state, and a combination thereof.

2. The alarm method of claim 1, wherein the step of determining said alarm state further comprises the substeps of:

detecting said transmitting failure state of said self-repeating module when said first signal level is lower than said first reference level, wherein said first signal level is transmitted by said self-repeating module to another repeating module; and detecting said VSWR failure state of said self-repeating module when said second signal level is higher than said second reference level, wherein said second signal level is generated from an antenna of said self-repeating module.

3. An alarm apparatus in a mobile communication repeating system having a plurality of repeating modules and a repeating interface unit for providing interface between said repeating modules and a base station transceiver, said apparatus comprising:

an alarm monitor connected to said repeating interface unit, for transmitting a state inquiry message for inquiring whether said plurality of repeating modules are out of order by sequentially designating said repeating modules, and informing said base station transceiver of an alarm state according to state information included in an acknowledge message that is received from at least one of said plurality of repeating modules; and a failure detector connected to each of said repeating modules, for checking whether a self-repeating module is out of order in response to said state inquiry message designating said self-repeating module by detecting a transmitting signal level output from said self-repeating module to another repeating module and comparing said transmitting signal level output to a reference level, and transmitting said state information to said alarm monitor.

4. The alarm apparatus of claim 3, wherein each of said alarm monitor and said failure detector include a modem, operatively connected to a transmission path between said interface unit and said repeating modules, for transmitting and receiving said state inquiry message and said acknowledge message.

5. The alarm apparatus of claim 4, wherein said failure detectors comprises:

a first level detector for detecting said transmitting signal level output from said self-repeating module to another repeating module;

a directional coupler, operatively disposed in a signal transmission path to an antenna of said self-repeating module, for inducing a signal reflected from said antenna;

a second level detector, operatively connected to said directional coupler, for detecting a reflection signal level generated from said directional coupler; and a controller, operatively connected to said first level detector and said second level detector, for checking whether said self-repeating module is in a failure state.

6. The alarm apparatus of claim 5, wherein said controller checks whether said self-repeating module is in said failure state by confirming said transmitting signal level and said reflection signal level generated from said first and second level detectors upon receiving said state inquiry message designating said self-repeating module, and transmitting said acknowledge message to said alarm monitor through said modem.

7. The alarm apparatus as claimed in claim 6, wherein said controller determines that said failure state of a corresponding repeating module is one of a transmitting failure state when said transmitting signal level is lower than said reference level and a voltage standing wave ratio (VSWR) failure state when said reflection signal level is higher than another reference level.

8. The alarm apparatus of claim 3, wherein each of said plurality of repeating modules has a unique identification.

9. The alarm apparatus of claim 3, wherein said alarm monitor updates alarm state information for said base station transceiver when said confirmation of said alarm state is complete with respect to all of said plurality of repeating modules.

10. The alarm apparatus of claim 3, wherein said alarm monitor further determines that a corresponding repeating module is out of order when there is no response to said state inquiry message.

11. The alarm apparatus of claim 5, wherein said controller is a microcontroller of said self-repeating module.

* * * * *